United States Patent
Kaneko (10) Patent No.: US 6,744,480 B2
(45) Date of Patent: Jun. 1, 2004

(54) LIQUID CRYSTAL DISPLAY DEVICE

(75) Inventor: Yasushi Kaneko, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/132,725

(22) Filed: Apr. 26, 2002

(65) Prior Publication Data

US 2002/0176036 A1 Nov. 28, 2002

(30) Foreign Application Priority Data

Apr. 27, 2001 (JP) .......................................... 2001-130698
Feb. 21, 2002 (JP) .......................................... 2002-044076

(51) Int. Cl.$^7$ .......................................... G02F 1/1335
(52) U.S. Cl. .......................................... 349/65; 349/64
(58) Field of Search .......................................... 349/60, 61, 62, 349/63, 64, 142, 144, 192, 65; 362/31

(56) References Cited

U.S. PATENT DOCUMENTS 5,973,833 A * 10/1999 Booth et al. ................. 359/487
6,339,501 B1 * 1/2002 Kameyama et al. ........ 359/485
6,504,589 B1 * 1/2003 Kashima et al. ............. 349/96

FOREIGN PATENT DOCUMENTS

| JP | 11-142849 | 5/1999 |
| JP | 2000-330107 | 11/2000 |
| JP | 2001-52520 | 2/2001 |
| JP | 2001-83502 | 3/2001 |
| JP | 2001-83508 | 3/2001 |
| JP | 2001-228332 | 8/2001 |
| JP | 2001-235623 | 8/2001 |

* cited by examiner

Primary Examiner—Robert H. Kim
Assistant Examiner—David Y. Chung
(74) Attorney, Agent, or Firm—Westerman, Hattori, Daniels & Adrian, LLP (57) ABSTRACT

A nematic liquid crystal (6) with twisted alignment is held between a first substrate (1) having a first electrode (3) and a second substrate (2) having a second electrode (4) to constitute a liquid crystal cell (20), an upper polarizer (11) is provided outside the second substrate (2) at a visible side thereof, a lower polarizer (12) and a scattering layer (9) are provided outside the fist substrate (1) at a side opposite to the visible side of the liquid crystal cell (20), and outside them, a light guide film (8) of side light type and a reflector (7) are placed in order. The light guide film (8) is a light guide film with a light scattering property in which particles with a scattering property are mixed, and each of the scattering layer (9) and the light guide film (8) has a property of scattering incident light while substantially maintaining a polarizing state thereof.

16 Claims, 7 Drawing Sheets

LIQUID CRYSTAL DISPLAY DEVICE

BACKGROUND OF THE INVENTION

1. Field of the Invention

The present invention relates to a liquid crystal display device, and particularly relates to a transflective liquid crystal display device capable of a display in a reflection mode utilizing external light and a display in a transmission mode in which backlight is turned on.

2. Description of the Related Art

Following the widespread use of cellular phones and personal digital assistants, portable information processing devices are on the market in volume. While reduction in size and weight is underway, high performance and color display are in demand in these portable information processing devices. In the display devices of these portable information processing devices, transflective liquid crystal display devices, which is capable of a reflection mode display by external light with less power consumption and a transmission mode display by backlight to improve visibility during night and the like, are mainly used.

In a conventional transflective liquid crystal display device, a polarizer and a transflective reflector are placed at a side opposite to a visible side of a liquid crystal cell. However, this transflective reflector uses a semitransparent plastic film or a thin metal film of half mirror, and its reflectivity R is expressed by Reflectivity R=100−(transmittance T+light absorption ratio A) [%], and even if a material with a very low light absorption ratio A is used, the reflectivity R becomes low when the transmittance T is made high, and one of the transmission mode display and the reflection mode display becomes a dark display.

Thus, for example, as disclosed in JP, 2000-330107, A, a liquid crystal display device, which includes a scattering layer with a polarization maintaining property, a light guide film formed with a special projection and depression form on a top face thereof and a reflector on a side opposite to a visible side of a liquid crystal cell including a pair of polarizers, is proposed, and according to this, a bright reflection display is made possible though the transmittance is very high.

Figure 13:
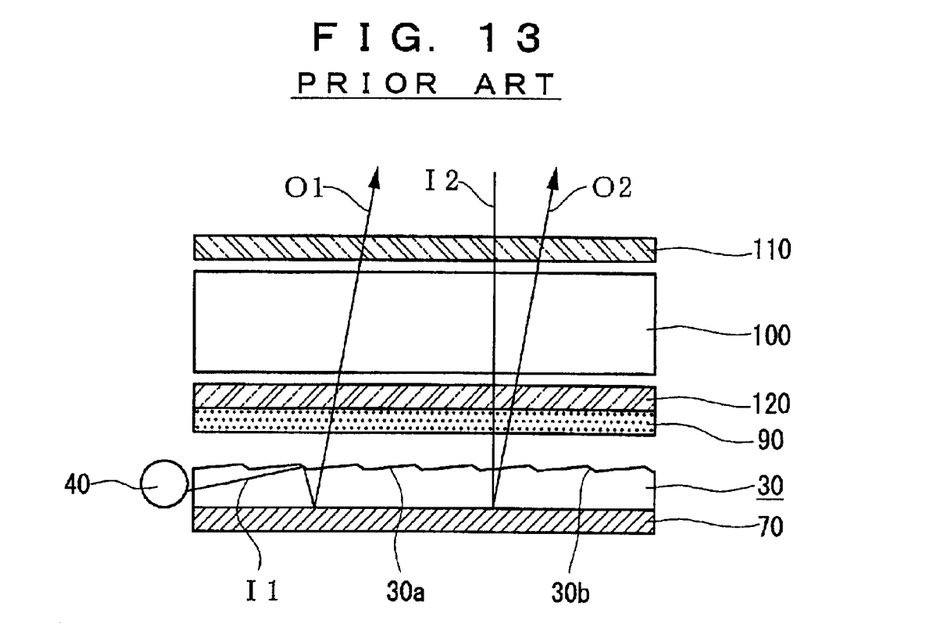
FIG. 13 is a schematic view to explain a constitution and effects of an example of a conventional liquid crystal display device.

The conventional liquid crystal display device is constituted of an upper polarizer 110, a liquid crystal cell 100, a lower polarizer 120, a scattering layer 90, a transparent light guide film 30 and a light source 40, and a reflector 70, as shown in FIG. 13. Prismatic projections and depressions constituted by slant faces 30b each with an inclination angle of 35 to 40 degrees and flat faces 30a each with an inclination angle of 10 degrees or less are formed on a top face of the light guide film 30. The light guide film 30 and the light source 40 constitute a backlight.

In this liquid crystal device, when the light source 40 is turned on, incident light I1 to the light guide film 30 from the light source 40 is reflected downward by the slant face 30b and is reflected again by the reflector 70, it is transmitted through the flat face 30a, further transmitted though the scattering layer 90, the lower polarizer 120, the liquid crystal cell 100 and the upper polarizer 110 to be emitted light O1 and emitted to the visible side (the upper side in FIG. 13). Since no transflective films such as half mirrors are not provided in an emission route of the light from the above-described light source 40, in this liquid crystal display device, a bright display in the transmission mode can be obtained as in an ordinary transmission type liquid crystal display device.

Meanwhile, in the case of the reflection mode display by external light, incident light I2 from the visible side is transmitted through the upper polarizer 110, the liquid crystal cell 100, the lower polarizer 120 and the scattering layer 90, and reaches the light guide film 30. Further, the light which reaches the flat face 30a of the light guide film 30 travels in a straight line inside the light guide film 30, reflected by the reflector 70, emitted from the flat face 30a of the light guide film 30, transmitted through the scattering layer 90, the lower polarizer 120, the liquid crystal cell 100 and the upper polarizer 110, and emitted to the visible side as emitted light O2. In the case in which a mirror tuning reflector such as a thin metal film is used for the reflector 70, the area other than that in the specular reflection direction becomes dark, and therefore the scattering layer 90 is provided.

Here, if the scattering layer 90 has a high degree of depolarization, namely, if it has the property of changing the polarizing state of the incident light to a large extent, the incident light I2 and the reflected light which reaches the lower polarizer 120 have different polarizing states, and the amount of light transmitted through the lower polarizer 120, namely, the amount of light of the emitted light O2 decreases, thus making the display dark. However, by using the scattering layer 90 having a polarization maintaining property, a bright display in the reflection mode is made possible.

However, it is necessary to design the light guide film 30 for each liquid crystal cell because a pitch of the prismatic projections and depressions on the surface of the light guide film 30 and a pixel pitch of the liquid crystal cell 100 interfere with each other to cause moire, thus causing a disadvantage of increasing the cost.

If a prism sheet is placed between the light guide film 30 and the scattering layer 90 for the purpose of increasing transmission luminance, polarization of the light reflected by the reflector 70 is depolarized when it passes through the prism sheet in the case of the reflection mode, and a part of the reflected light is absorbed in the lower polarizer 120 and is not emitted to the visible side, thus causing the disadvantage that the display in the reflection mode becomes dark.

Figure 14:
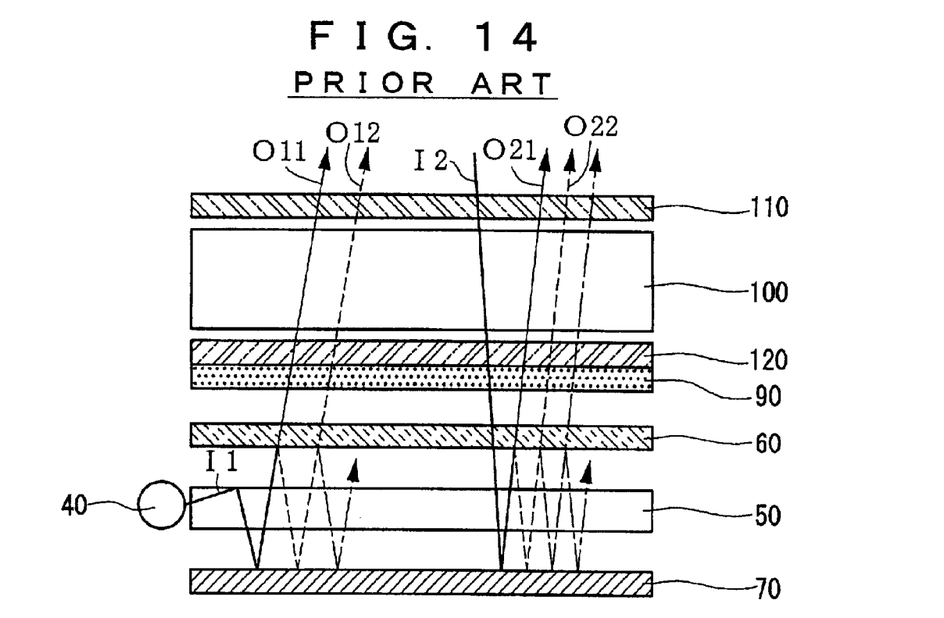
FIG. 14 is a schematic view to explain a constitution and effects of another example of the conventional liquid crystal display device.

Next, another prior art by which the same effect can be obtained without using the light guide film in a complicated shape as in the above prior art will be explained. This is, for example, a liquid crystal display device disclosed in JP, 2001-83502, A, and a schematic configuration thereof is shown in FIG. 14. In FIG. 14, the parts corresponding to those in FIG. 13 are given the same reference numerals and symbols.

As a light guide film composing backlight with the light source 40 by LED, this liquid crystal display device comprises a transparent light guide film 50, which is formed to have fixed thickness by a transparent resin such as acrylic resin, polycarbonate resin, and amorphous polyolefin resin, an inorganic transparent material such as glass, or a composite of them, and which has a number of small projections (omitted in the drawing) formed on its surface.

It also comprises a reflection type polarizer 60 having a reflection axis and a transmission axis between the light guide film 50 and the scattering layer 90.

In this reflection type polarizer 60, the reflection axis and the transmission axis intersect each other orthogonally, and the transmission axis is placed to substantially correspond to a transmission axis of the lower polarizer 120, whereby a bright display in the reflection mode is obtained.

Namely, the incident light I2 from an upper side, part of which is depolarized when transmitted through the light guide film 50, is reflected by a reflector 70 in a state in which the polarization direction is rotated. Then, the reflected light of which polarization direction is not rotated is transmitted through the reflection type polarizer 60, the lower polarizer 120, the liquid crystal cell 100 and the upper polarizer 110 and emitted to the visible side as emitted light O21. Further, the light of which polarization direction is rotated inside the light guide film 50 is reflected downward by the reflection type polarizer 60, transmitted through the light guide film 50 again, reflected by the reflector 70 and reaches the reflection type polarizer 60 again. On this occasion, the polarization direction of a part of the light is rotated inside the light guide film 50 and aligned in a direction of the transmission axis of the reflection type polarizer 60, and thus the part of the light is transmitted through the reflection type polarizer 60 and emitted to the visible side as emitted light O22. As described above, by repeating reflection several times, a substantial part of the incident light I2 is emitted to the visible side, and a bright display in the reflection mode can be obtained.

On the other hand, in the transmission mode, incident light I1 onto the light guide film 50 from the light source 40 is reflected downward by the small projections (illustration is omitted) formed on the top face of the light guide film 50, the reflected light is reflected by the reflector 70 and transmitted through the light guide film 50, and reaches the reflection type polarizer 60. In this situation, the light polarized in the direction of the transmission axis of the reflection type polarizer 60 is transmitted and is emitted to the visible side as emitted light O11.

The residual light is reflected by the reflection type polarizer 60, transmitted through the light guide film again, reflected by the reflector 70, and reaches the reflection type polarizer 60 again. On this occasion, the polarization direction is rotated inside the light guide film 50, and therefore the light which comes to be polarized in the direction of the transmission axis of the reflection type polarizer 60 is transmitted through the reflection type of polarizer 60 and emitted to the visible side as emitted light O12. By repeating reflection several times as described above, a substantial part of the incident light I1 is emitted to the visible side, and a bright display can be also obtained in the transmission mode.

However, in the light guide film 50 of this prior art, the above-described small projections on its top face are formed by injection molding, and on this occasion, retardation unevenness occurs, which causes unevenness in depolarization ability. As a result, even if incident light is repeatedly reflected between the reflection type polarizer 60 and the reflector 70, the unevenness is not eliminated completely, and thus unevenness easily occurs to the brightness in display.

When the light guide film of only a transparent resin without the small projections being provided on its top face is used, a favorable bright display can be obtained in the reflection mode, but in the transmission mode, the light from the light source 40 is not favorably reflected upward, and thus the amount of emitted light to the visible side decreases, resulting in a dark display.

Further, either of the above-described two conventional liquid crystal display devices provides a display with a sense of depth because the reflector 70 is located with a distance from the liquid crystal cell 100 in either of the devices.

SUMMARY OF THE INVENTION

The invention is made to eliminate various problems in the conventional transflective liquid crystal display device as described above, and has its object to make it possible to obtain a bright display in both a reflection mode and a transmission mode, to eliminate occurrence of moire with a simple structure and eliminate occurrence of unevenness to the brightness of the display, and to obtain a display without a sense of depth in the reflection mode.

The liquid crystal display device according to the invention is constituted as follows to attain the above-described object.

A liquid crystal cell holding nematic liquid crystal with twisted alignment between a first substrate having a first electrode and a second substrate having a second electrode, an upper polarizer provided outside the second substrate at a visible side of the liquid crystal cell, a lower polarizer and a scattering layer provided outside the first substrate at a side opposite to the visible side of the liquid crystal cell, a light guide film of side light type provided outside the lower polarizer and light scattering layer, and a reflector provided outside the light guide film are included.

The light guide film is a light guide film with a light scattering property in which particles with the scattering property are mixed, and each of the scattering layer and light guide film with the light scattering property has a property of scattering incident light while substantially maintaining a polarizing state thereof.

Further, it is preferable to provide a reflection type polarizer having a reflection axis and a transmission axis between the light guide film and the lower polarizer or the scattering layer. Alternatively, instead of the reflection type polarizer, a prism sheet or a scattering sheet may be provided.

Furthermore, it may be suitable to provide the reflection type polarizer having the reflection axis and the transmission axis between the light guide film and lower polarizer or the scattering layer and further provide either of the prism sheet or the scattering sheet, or both of them between the light guide film and the reflection type polarizer.

Further, it is preferable to provide one or a plurality of optical compensators between the second substrate of the liquid crystal cell and the upper polarizer.

The reflector may be a reflection type polarizer.

It is preferable that the light guide film is constituted of a semitransparent material with a haze value indicating a scattering degree being 20% to 50%, and for example, it is preferable that it is constituted of a methacrylic resin in which fine particles of a silicon resin are mixed.

Further, if a color filter of a plurality of colors is provided at either one of the first substrate or the second substrate of the liquid crystal cell, a bright color display can be obtained in the reflection mode and the transmission mode.

The above and other objects, features and advantages of the invention will be apparent from the following detailed description which is to be read in conjunction with the accompanying drawings.

DETAILED DESCRIPTION OF THE PREFERRED EMBODIMENTS

Figure 1:
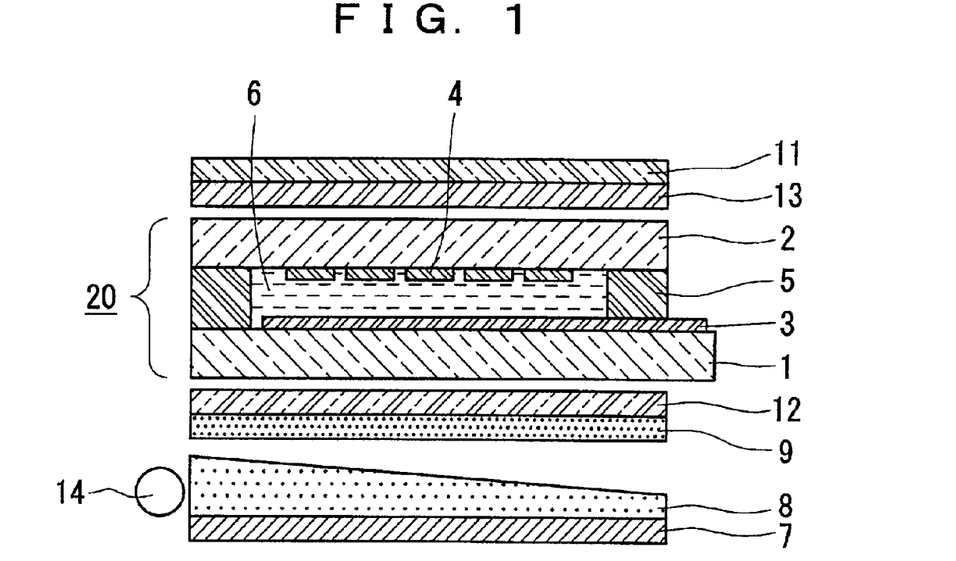
FIG. 1 is a schematic sectional view showing a constitution of a first embodiment of a liquid crystal display device according to the invention.
Figure 2:
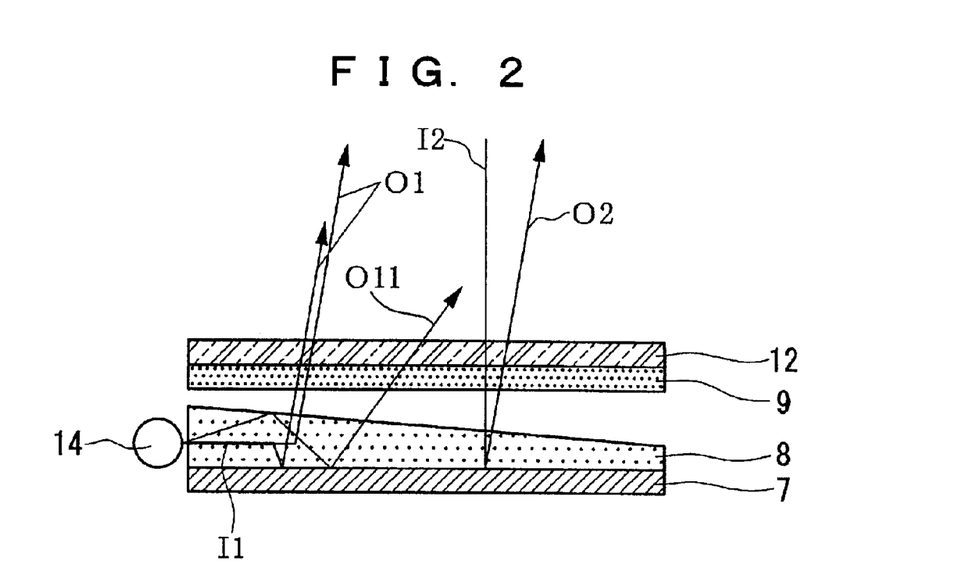
FIG. 2 is a schematic view to explain effects thereof.

Hereinafter, preferred embodiments for carrying out the present invention will be described based on the drawings.
First Embodiment: FIG. 1 and FIG. 2

A first embodiment of a liquid crystal display device according to the invention will be explained based on FIG. 1 and FIG. 2. FIG. 1 is a schematic sectional view showing a constitution of the liquid crystal display device, and FIG. 2 is a schematic view to explain effects thereof.

As shown in FIG. 1, the liquid crystal display device according to the first embodiment is constituted of an upper polarizer 11, a retardation film 13 as an optical compensator, a liquid crystal cell 20, a lower polarizer 12, a scattering layer 9, a light guide film 8 of sidelight type comprising a light source 14 at a side face thereof, and a reflector 7, from a visible side (an upper side in FIG. 1). Either the lower polarizer 12 or the scattering layer 9 may be on an upper side (a side adjacent to the liquid crystal cell 20).

The upper polarizer 11 and the retardation film 13 are bonded with an acrylic adhesive to be integrated, and the retardation film 13 and a second substrate 2 of the liquid crystal cell 20, and a first substrate 1 of the liquid crystal cell 20 and the lower polarizer 12 are respectively bonded with the acrylic adhesive.

As the liquid crystal cell 20, a liquid crystal cell of an STN mode using the retardation film is used in this embodiment. This liquid crystal cell 20 has the first substrate 1 and the second substrate 2 each formed of a glass plate of 0.5 mm thickness bonded to each other with a sealing material 5. Scanning electrodes 3 constituted of ITO being a transparent electrode material are formed on an inner face of the first substrate 1, which opposes the second substrate 2, and signal electrodes 4 constituted of ITO is formed on an inner face of the second substrate 2, which opposes the first substrate 1. Nematic liquid crystal 6 with twisted alignment at 240° in a counterclockwise direction is sandwiched between the first substrate 1 and the second substrate 2. The scanning electrodes 3 and the signal electrodes 4 are formed in a stripe form orthogonally intersecting each other, and the parts at which they are intersecting each other and overlap each other flatwise become pixel portions.

The upper polarizer 11 and the lower polarizer 12 are absorption-type polarizers each having a transmission axis and an absorption axis orthogonally intersecting, transmitting a linearly polarized light polarized in a direction of the transmission axis, and absorbing linearly polarized light polarized in a direction of the absorption axis, and in this embodiment, an iodic polarizer with single transmittance of 46% and polarization efficiency of 99% is used.

As for the retardation film 13 being an optical compensator, a retardation film with a retardation value of 0.58 $\mu$m, which is made by uniaxial stretching of a polycarbonate film, is used.

As the scattering layer 9, a scattering film having a polarization maintaining property with a haze value indicating a scattering degree of 80%, which is made by mixing fine particles into a transparent resin, is used. This scattering film is characterized by having little retardation and a high front scattering degree. It has a low depolarization degree, and has a property of scattering incident light while substantially maintaining a polarization state of the incident light.

As the light guide film 8, a wedge-shaped light guide film with a scattering property with the haze value indicating the scattering degree of 21 to 32%, with the thickness of 1.5 mm at an end portion at the side of the light source 14 and 0.5 mm at an end portion at the side opposite to the light source 14, which is made by mixing a silicon resin with an average grain diameter of 2 $\mu$m into a methacrylic resin, is used. Namely, as shown in FIG. 1, a top face (a face on a side adjacent to the lower polarizer 12 and the scattering layer 9) of the light guide film is a slant face with a downward gradient from an end portion at the side of the light source 14 to an end portion at the opposite side thereto.

The light guide film 8 does not have special projections or depressions formed on its front and back faces, and hardly has a depolarization property. Namely, it has a property of substantially maintaining a polarization state of incident light. It is possible to use a resin with high transparency and low birefringence effect such as a polycarbonate resin and a norbornene resin, other than a methacrylic resin. As the fine particle with the scattering property, it is possible to use an inorganic fine particle such as alumina and titania, and an organic fine particle such as polyester and epoxy, other than a silicon resin.

It is preferable that the reflector 7 is in a mirror form to maintain polarization. Although it is possible to use a reflection film which is made by forming an aluminum film, or a silver film on a resin film, or a thin film made by rolling metal, a reflector in a mirror form with reflectivity of 90% or more, which is made by forming an aluminum film on a transparent film by spattering, is used in this embodiment.

As the light source 14, it is possible to use a cold cathode type fluorescent tube or a light-emitting diode. In this embodiment, a multiple white LEDs arranged side by side are used. As a result, luminance of 500 cd/m$^2$ can be obtained as backlight.

A birefringence difference $\Delta$n of the nematic liquid crystal 6 which is used is set to be 0.131, and a cell gap d being a gap between the first substrate 1 and the second substrate 2 is set to be 6.2 $\mu$m. Consequently, a value $\Delta$nd indicating an amount of birefringence of the liquid crystal cell 20, which is expressed by a product of the birefringence difference $\Delta$n of the nematic liquid crystal 6 and the cell gap d is 0.81 $\mu$m.

Here, the light guide film 8 and the scattering layer 9 will be further explained.

The light guide film 8 has a light scattering property since fine particles with the scattering property are mixed therein as described above. However, since small projections and the like are not formed thereon, uneven force is not exerted at the time of injection molding, and thus it does not have very high retardation and less unevenness in the retardation. Further, it has less depolarization property, and it substantially maintains the polarizing state of the incident light.

As for the scattering layer 9, a material having the scattering property but less depolarization property is selected similarly. The light scattering property is evaluated with use of a haze value defined by using total light transmittance which is measured by using an integrating sphere and straight light transmittance of the transmission in a direction parallel to an incident direction, and the larger the haze value is, the larger the light scattering property is. The haze value is defined by Haze value (%)=100×scattering light transmittance/total light transmittance Scattering light transmittance=total light transmittance−straight light transmittance In this embodiment, the scattering layer 9 with the total light transmittance of 98%, the scattering light transmittance of 80% and the haze value of 82%, and the light guide film 8 with the total light transmittance of 95%, the scattering light transmittance of 20 to 30% and the haze value of 21 to 32% are used.

With use of FIG. 2, the effects of this liquid crystal display device will be explained. Firstly, the transmission mode in which the light source 14 is turned on will be explained.

The incident light 11, which is outputted from the light source 14 and incident on the light guide film 8, is scattered due to the fine particles with the scattering property inside when it propagates in the light guide film 8, and a part of it is directly emitted upward, and another part is emitted downward and after it is reflected at the reflector 7, it is emitted upward, and they are respectively pass through the scattering layer 9 and the lower polarizer 12 and are emitted to the visible side as the emitted light O1. Further, a part of the incident light is reflected at the slant top face toward the reflector 7, then totally reflected at the reflector 7, and is emitted to the visible side as the emitted light O11. Consequently, a bright transmission display can be obtained.

Next, the reflection mode in which the light source 14 is turned off and external light is utilized will be explained.

The external light is incident from an upper side in FIG. 1, and is transmitted through the upper polarizer 11 to be linearly polarized light, and passes through the liquid crystal cell 20 to reach the lower polarizer 12 as the incident light I2. In the case of a while display, the polarization direction of the incident light I2 transmitted through the liquid crystal cell 20 substantially corresponds to the direction of the transmission axis of the lower polarizer 12, and therefore it is transmitted through the lower polarizer 12 and the scattering layer 9 and reaches the light guide film 8. Here, both of the scattering layer 9 and the light guide film 8 have little depolarization property and maintain the polarizing state of the incident light, and therefore the incident light I2 is transmitted through the scattering layer 9 and the light guide film 8 while maintaining the polarizing state in the direction of the transmission axis of the lower polarizer 12, then reflected at the reflector 7, and passes through the light guide film 8 and the scattering layer 9 again. Subsequently, it passes through the liquid crystal cell 20 and the upper polarizer 11 and is emitted to the visible side as the emitted light O2.

Namely, since both the scattering layer 9 and the light guide film 8 have little depolarizing property, the linearly polarized light reflected by the reflector 7 is transmitted through the lower polarizer 12 again while maintaining the polarizing state in the direction of the transmission axis of the lower polarizer 12. The light thus passing through the lower polarizer 12 is reflected at the reflector 7, passes through the lower polarizer 12 again and becomes the emitted light O2 while maintaining the polarizing state in the direction of the transmission axis thereof, thereby making it possible to obtain a bright display even in the reflection mode.

Here, without the scattering layer 9, all the incident light I2 is reflected in the specular reflection direction, and it is not reflected to the direction of the visible side, resulting in a dark display. The light guide film 8 also has a light scattering property, and an optimal light scattering property is obtained by the scattering property of the light guide film 8 and the scattering property of the scattering layer 9, as a result of which, reflected light by the reflector 7 is emitted to the direction of the visible side. Since the light guide film 8 has little unevenness in the retardation, uniform reflection display can be obtained.

Further, since the light guide film explained in the paragraph of the repeated art is completely transparent, a sense of depth is provided by the sight of the reflector, but in the liquid crystal display device according to the invention, the reflector 7 is hardly seen because the light guide film 8 is given the scattering property, and as a result, an easily viewable display without a sense of depth is obtained.

Furthermore, since complicated projections and depressions, or small projections are not formed on the surface of the light guide film as in the liquid crystal display device explained in the paragraph of the related art, moire caused by the interference with the display pixels does not occur.

Figure 3:
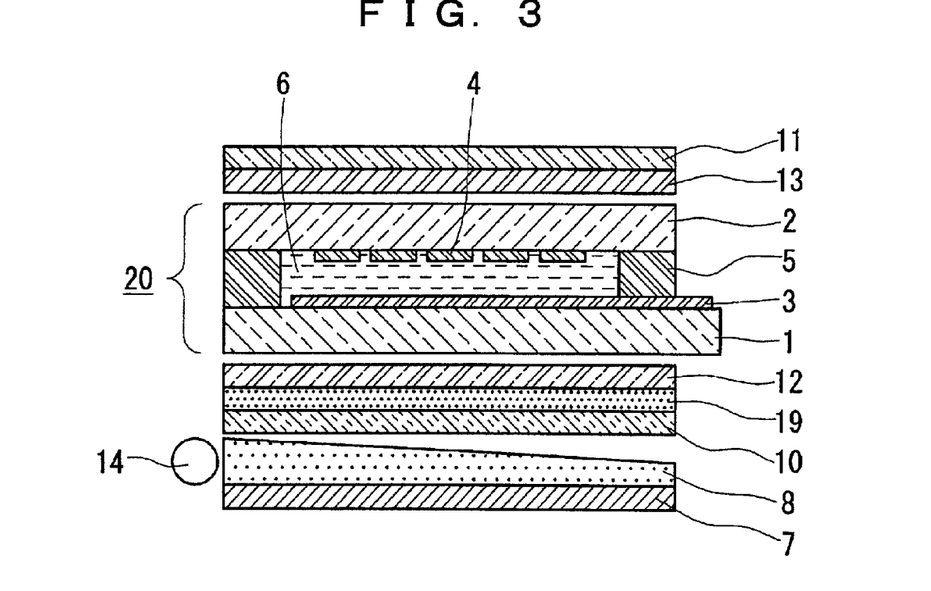
FIG. 3 is a schematic sectional view showing a constitution of a second embodiment of the liquid crystal display device according to the invention.
Figure 4:
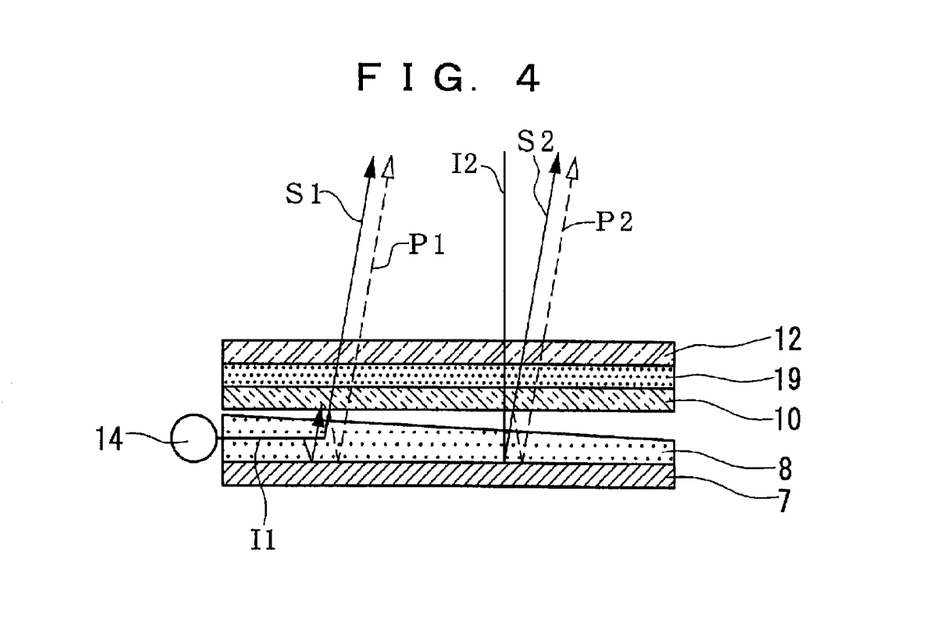
FIG. 4 is a schematic view to explain effects thereof.
Figure 5:
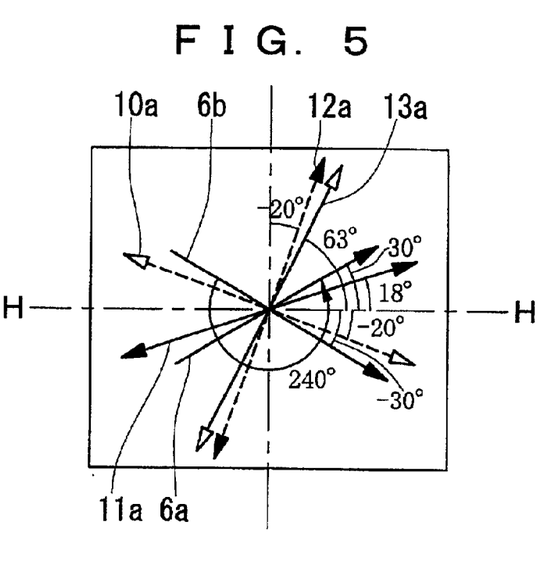
FIG. 5 is a diagram to explain planar disposition relationship of components thereof.

Second Embodiment: FIG. 3 to FIG. 5

Next, a second embodiment of the liquid crystal display device according to the invention, which is designed to obtain a brighter display, will be explained based on FIG. 3 to FIG. 5. FIG. 3 is a schematic sectional view to explain a constitution of the liquid crystal display device, FIG. 4 is a schematic view to explain the effects of the liquid crystal display device, and FIG. 5 is an explanatory view showing a planar disposition relationship of components thereof.

The liquid crystal display device according to the second embodiment is constituted of an upper polarizer 11, a retardation film 13 as an optical compensator, a liquid crystal cell 20, a lower polarizer 12, a scattering layer 19 and a reflection type polarizer 10, a light guide film 8 of sidelight type including a light source 14 at a side face thereof, and a reflector 7, from a visible side (an upper side in FIG. 3). All the component materials of this second embodiment except for the scattering layer 19 and the reflection type polarizer 10 are the same as the component materials of the first embodiment shown in FIG. 1, and the explanation thereof will be omitted.

The second embodiment is characterized in that the reflection type polarizer 10 is provided between the light guide film 8 and the lower polarizer 12. The lower polarizer 12 and the reflection type polarizer 10 are bonded by an adhesive with a scattering property constituting the scattering layer 19 to be integrated, and a first substrate 1 of the liquid crystal cell 20 and the lower polarizer 12 are bonded to each other by an acrylic adhesive.

The reflection type polarizer 10 is a multi-layered film made by overlaying several hundreds layers of transparent materials with different refraction indices, which has a reflection axis and a transmission axis orthogonally intersecting each other, and it reflects linearly polarized light polarized in a direction of the reflection axis and transmits linearly polarized light polarized in a direction of the transmission axis. Accordingly, if the arrangement is made so that the transmission axis of the lower polarizer 12 and the transmission axis of the reflection type polarizer 10 correspond to each other, linearly polarized light polarized in the direction of the transmission axes out of the incident light is transmitted through the lower polarizer 12 and the reflection type polarizer 10.

As this reflection type polarizer 10, for example, the product under the trade name D-BEF manufactured by 3M Co., Ltd. can be used, but other than this, a reflection type polarizer using selective reflection of a cholesteric film or the like can be used.

As the scattering layer 19, the scattering adhesive layer with a haze value indicating the scattering degree being 82%, which is made by mixing very fine particles into an acrylic adhesive, is used. The scattering layer 19 has very low depolarization degree, has a property of substantially maintaining a polarizing state of the incident light, and further has very little back scattering that scatters light to the incident side. It is possible to use a scattering film (the scattering layer 9 used in the first embodiment) with a polarization maintaining property, which is made by mixing very fine particles into a transparent resin.

As for the positional relationship of the lower polarizer 12 and the scattering layer 19, either one may be placed at a side adjacent to the liquid crystal cell 20.

Here, planar disposition relationship of the components in the liquid crystal display device according to second embodiment will be explained based on FIG. 5. As for the angle in FIG. 5 in the following explanation, with the horizontal axis H—H in the display screen as a reference, the counterclockwise turn (leftward turn) is assumed to be plus (+), and the clockwise turn (rightward turn) is assumed to be minus (−).

As shown in FIG. 5, an absorption axis 11a of the upper polarizer 11 is placed at +18° with the horizontal axis H—H as a reference. The retardation axis 13a of the retardation film 13 is placed at +63° with the horizontal axis H—H as a reference, and an absorption axis 12a of the lower polarizer 12 is placed at +70° (−20° from the vertical axis) with the horizontal axis H—H as a reference. A transmission axis 10a of the reflection type polarizer 10 is placed to correspond to the transmission axis of the lower polarizer 12. Namely, the transmission axis 10a of the reflection type polarizer 10 is placed at −20° to orthogonally intersect the absorption axis 12a of the lower polarizer 12. In the liquid crystal display device constituted as above, a display in a normally white mode capable of a black display in a favorable white background with high contrast can be performed.

Next, the effects of this liquid crystal display device will be explained with reference to FIG. 4.

First, the transmission mode in which the light source 14 is turned on will be explained. As shown in FIG. 4, the incident light I1 from the side face of the light guide film 8 by light emission of the light source 14 is propagated inside the light guide film 8, but is scattered by the fine particles with the scattering property inside, and a part of it is directly emitted upward, while another part of it is emitted downward, then reflected by the reflector 7, and emitted upward. The light, which is emitted upward directly from the light guide film 8, and the reflected light, which is reflected at the reflector 7, pass through the reflection type polarizer 10, the scattering layer 19 and the lower polarizer 12, and enter the liquid crystal cell 20 as linearly polarized light S1.

Here, the reflection type polarizer 10 has the transmission axis and the reflection axis, and therefore the linearly polarized light S1 polarized in the direction of the transmission axis is transmitted and enters the liquid crystal cell 20, but the linearly polarized light polarized in the direction of the reflection axis orthogonally intersecting the transmission axis is reflected.

The light guide film 8 has little depolarization property but does not maintain 100% of the polarization degree, and therefore the linearly polarized light (whose polarization direction is orthogonal to that of the linearly polarized light S1), which is reflected by the reflection type polarizer 10, has the polarization direction thereof rotated a little by the fine particles with the scattering property when it passes through the light guide film 8. Subsequently, when it is reflected at the reflector 7 and reaches the reflection type polarizer 10 again, a part of the reflected light has the polarization direction in the same direction as the linearly polarized light S1, and it is transmitted through the reflection type polarizer 10 and can enter the liquid crystal cell 20 as linearly polarized light P1.

Accordingly, as shown in FIG. 5, by placing the transmission axis 10a of the reflection type polarizer 10 and the absorption axis 12a of the lower polarizer 12 at a suitable angle, a little rotation of the polarization direction in the light guide film 8 can be effectively utilized. By repeating reflection between the reflection type polarizer 10 and the reflector 7 several times, most of the linearly polarized light, which is reflected by the reflection type polarizer 10 at first, comes to have the same polarization direction as the linearly polarized light S1, and is transmitted through the reflection type polarizer 10 to be incident on the liquid crystal cell 20, and therefore light from the light source 14 can be effectively utilized, thus enabling a brighter display than in the first embodiment.

This reflection type polarizer 10 is originally an optical component that is developed to increase transmission luminance, but the light guide film 30 with projections and depressions being formed thereon, which is explained with FIG. 13 in the paragraph of the related art, has almost no scattering property, and therefore even if the light guide film with projections and depressions being formed thereon and the reflection type polarizer are combined, only little luminance increasing effect is obtained. However, in the liquid crystal display device of the invention, since the light guide film 8 having the light scattering property is used, large effect can be obtained, and resulting in a bright display even in the transmission mode.

Next, the reflection mode in which the light source 14 is turned off and external light is utilized will be explained.

The external light is incident from the upper side in FIG. 3, then transmitted through the upper polarizer 11 and becomes a linearly polarized light, passes through the liquid crystal cell 20, and reaches the lower polarizer 12 as the incident light I2 shown in FIG. 4. In the case of a white display, the polarization direction of the incident light I2 transmitted through the liquid crystal cell 20 substantially corresponds to the direction of the transmission axis of the lower polarizer 12, and therefore the incident light I2 is transmitted through the lower polarizer 12, the scattering layer 19 and the reflection type polarizer 10 and reaches the light guide film 8.

Since the scattering layer 19 and the light guide film 8 each have little depolarizing property here, the transmitted light is transmitted through the scattering layer 19 and the light guide film 8 while maintaining a polarization state in the transmission direction of the lower polarizer 12, then reflected by the reflector 7 and is transmitted through the light guide film 8, the reflection type polarizer 10 and the scattering layer 19 again. Since the transmitted light maintains the polarization state in the transmission axis direction of the lower polarizer 12, it is transmitted through the lower polarizer 12, then transmitted through the liquid crystal cell 20 and the upper polarizer 11 in FIG. 3 as the linearly polarized light S2, and is emitted to the visible side. Accordingly, a bright display can be obtained even in the reflection mode.

Here, as explained in the above, the light guide film 8 cannot maintain 100% of the polarization state due to its scattering property, a part of the incident light 12 has the polarization direction thereof a little rotated, the light reflected by the reflector 7 cannot be completely transmitted through the reflection type polarizer 10, and a part of it is reflected and transmitted through the light guide film 8 again, then reflected by the reflector 7 and returned to the reflection type polarizer 10 again. A part of this light is returned to the same polarization direction as the incident light 12, then transmitted through the reflection type polarizer 10 and the lower polarizer 12 to be incident on the liquid crystal cell 20 as linearly polarized light P2, and emitted to the visible side together with the linearly polarized light S2, therefore making it possible to obtain a brighter reflection display.

However, even if the reflection type polarizer 10 is used, light absorption in the light guide film 8 and the reflector 7 occurs while reflection is repeated between the reflection type polarizer 10 and the reflector 7, and therefore it is preferable that the light guide film 8 has the smallest possible retardation and depolarization property, that is, has larger maintaining property of the polarization state.

Accordingly, when the light guide film having larger retardation unevenness as used in the prior art is used, unevenness according to a place cannot be eliminated, thus providing an uneven reflection display. If a transparent light guide film is used, a sense of a depth is provided, but the light guide film 8 of the present invention with the scattering fine particles being dispersed has less unevenness in the retardation value and depolarization property, and the reflector becomes hard to be seen due to the scattering property, thus making it possible to provide the bright and uniform reflection display without a sense of depth.

In the transmission mode in which the light source 14 is lit, the transmittance of the liquid crystal display device using the conventional transflective reflector is about 10 to 15%, but the transmittance of the liquid crystal display device of this embodiment is as high as 35 to 40%, and a display with high luminance, which is twice as high as the prior art or more, is obtained.

Further, in the reflection mode in which the light source 14 is turned off, external light can be effectively utilized, and the liquid crystal display device in the normally white mode is used in this embodiment, thus making it possible to effectively utilize light from between the pixels and obtain a bright display with about the same reflectivity as in the conventional liquid crystal display device using the transflective film.

Further, since the light guide film with the light scattering property in which the fine particles with the scattering property are mixed is used as the light guide film 8, moire caused by interference with the display pixels does not occur as in the conventional liquid crystal display device using the light guide film with projections and depressions or small projections being formed on the surface, and a favorable display is obtained. Furthermore, the light guide film has small retardance and small unevenness in the retardance and the reflector 7 is hard to be seen due to the scattering property of the light guide film 8, which makes it possible to obtain a uniform reflection display without a sense of depth.

Modifications of the First and Second Embodiments

In each of the embodiments described above, an STN mode liquid crystal cell 240° twisted is used as the liquid crystal cell 20, but the similar transflective liquid crystal display device can be also obtained with use of a TN liquid crystal cell with a twist angle of about 90°. In the case in which a large screen display is performed with use of the TN liquid crystal cell, it is preferable to provide an active matrix liquid crystal display device containing a thin film transistor (TFT), or an active cell such as an MIM cell.

Further, in each of the embodiments described above, one retardation film 13 is used as an optical compensator, but with use of a plurality of retardation films, the similar liquid crystal display device can be provided. With the same constitution as these embodiments, a retardation film with a retardation value of 0.2 $\mu$m and a retardation film with a retardation value of 0.4 $\mu$m are used as an optical compensator, and the absorption axis 11a of the upper polarizer is placed at −50° relative to the horizontal axis H—H, thereby a bright liquid crystal display device with high contrast is obtained.

As regards the light guide film 8, the light guide film with a haze value indicating a scattering degree being 21 to 32% is used, and if the haze value is small, the display in the reflection mode becomes bright but the display in the transmission mode becomes dark, and a sense of depth occurs to some extent. On the other hand, if the haze value is high, the display in the reflection mode becomes dark but the display in the transmission mode becomes bright.

Consequently, according to a design concept of the liquid crystal display device, it is preferable for making the display in the transmission mode bright that the haze value is 30 to 80%, more preferably, 30 to 50%. On the other hand, to make the display in the reflection mode bright, it is preferable that the haze value is 10 to 50%, more preferably, 20 to 40%. Accordingly, in consideration of both of the transmission mode and the reflection mode, the haze value of the light guide film 8 in the range of 20 to 50% is optimal.

Further, it is possible to insert a scattering sheet between the light guide film 8 and the reflection type polarizer 10 and adjust luminance at the time of transmission. As for the scattering sheet used in this case, a material with low depolarization degree is preferable.

Furthermore, in the second embodiment, the transmission axis of the lower polarizer 12 and the transmission axis of the reflection type polarizer 10 are placed to be in the same direction, but the transmission axis of the lower polarizer 12 and the transmission axis of the reflection type polarizer 10 are displaced a little, whereby it is possible to make the display in the reflection mode brighter though the display in the transmission mode becomes dark to some extent.

As compared with the second embodiment, the first embodiment does not comprise the reflection type polarizer 10, and thus the constitution becomes simple and the cost can be reduced. Further, the polarization direction of a part of the light is rotated by a slight depolarization property occurring when the light passes through the light guide film 8, and the light is absorbed by the lower polarizer 12, but since the depolarization property of this light guide film 8 is only a little, a reflection display bright enough in practical use can be obtained though it is a little darker as compared with the second embodiment.

Figure 6:
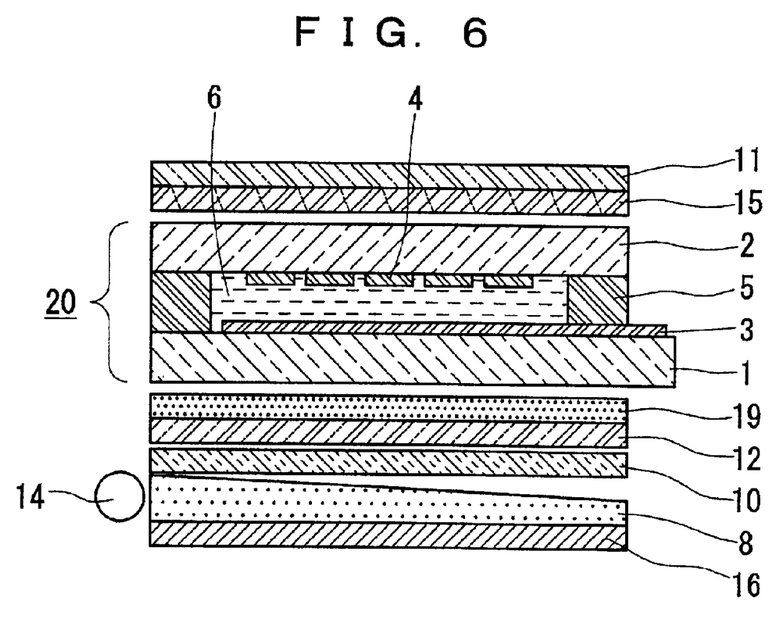
FIG. 6 is a schematic sectional view showing a constitution of a third embodiment of a liquid crystal display device according to the invention.
Figure 7:
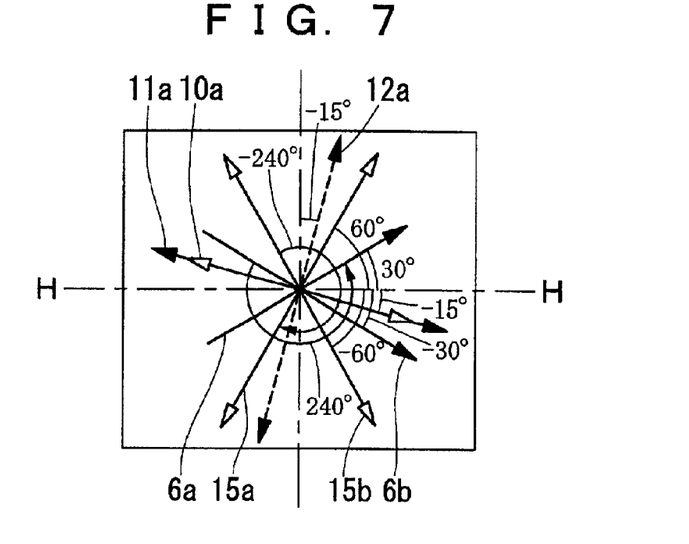
FIG. 7 is a diagram to explain planar disposition relationship of components thereof.
Figure 8:
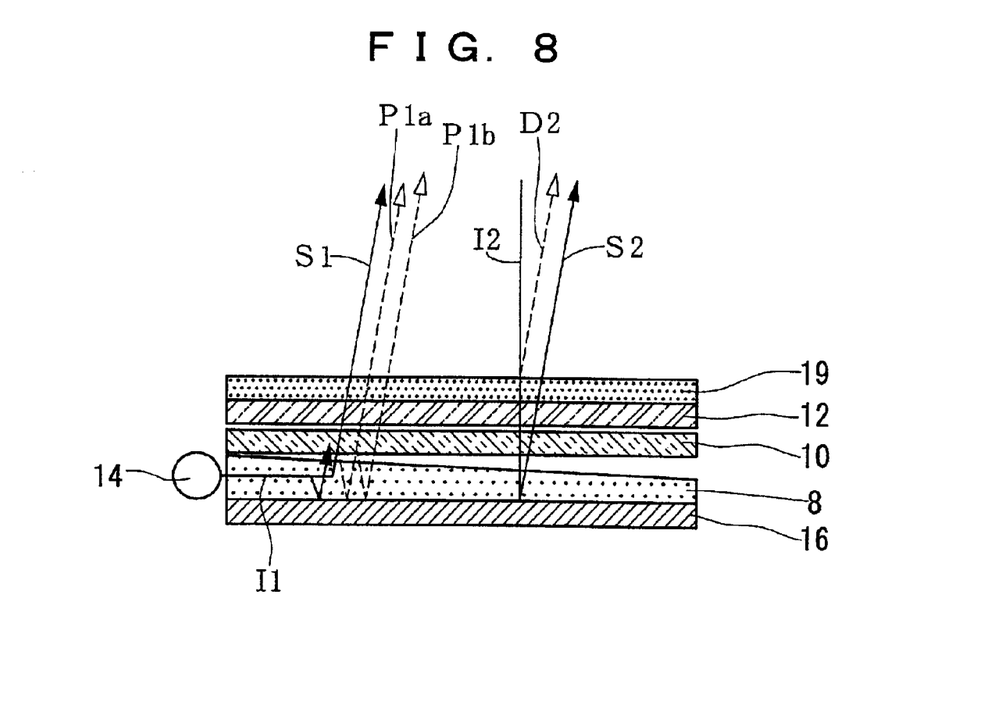
FIG. 8 is a schematic view to explain effects thereof.

Third Embodiment: FIG. 6 to FIG. 8

Next, a third embodiment of the liquid crystal display device according to the invention will be explained based on FIG. 6 to FIG. 8. FIG. 6 is a schematic sectional view to explain a constitution of the liquid crystal display device, and FIG. 7 is a plan view showing a planar disposition relationship of components thereof. In these drawings, the same components as in FIG. 1 to FIG. 5 are given the same reference numerals and symbols, and the explanation thereof will be omitted.

The liquid crystal display device according to the third embodiment differs from the second embodiment in the points that a scattering layer 19, a lower polarizer 12 and a reflection type polarizer 10 are placed in this order at a side opposite to a visible side of a liquid crystal cell 20 (at a lower side in FIG. 6), that a twisted retardation film 15 is used as an optical compensator, that a display mode is a normally black, and that a reflector 16 is a reflection type polarizer.

The upper polarizer 11 and the twisted retardation film 15 are bonded to each other to be integrated with an acrylic adhesive, and a second substrate 2 of the liquid crystal cell 20 and the twisted retardation film 15 are also bonded with an acrylic adhesive. The lower polarizer 12 is bonded to a first substrate 1 of the liquid crystal cell 20 with a scattering adhesive used as the scattering layer 19.

The reflection type polarizer 10 is placed on a light guide film 8 with a space being provided so as not to be in close contact therewith. The liquid crystal cell 20, the upper polarizer 11, the lower polarizer 12, the scattering layer 19, the reflection type polarizer 10, the light guide film 8, and a light source 14 are the same as used in the second embodiment, and therefore the explanation thereof will be omitted.

The twisted retardation film 15 is a film made by coating a triacetyl cellulose (TAC) film or a polyethylene terephthalate (PET) film with liquid crystal polymer having a twisted structure after alignment treatment is performed, then bringing this into a liquid crystal state at a high temperature of about 150° C. to adjust a twist angle, thereafter, rapidly cooling it at a room temperature and solidifying the twisted state.

Alternatively, a film, which is formed by performing alignment treatment on a film for alignment, coating the film with liquid crystal polymer, solidifying the twisted state, and thereafter transferring the liquid crystal polymer to a separately prepared TAC film from the film for alignment, may be used.

In this embodiment, a twisted retardation film with a twist angle of 240° in a clockwise direction and a Δnd value Rc indicating a birefringence effect being Rc=0.80 μm is used.

As the reflector 16, the product under the trade name of ESR manufactured by 3M Co., Ltd., which is a special reflector made by polarizing element with reflection type polarizers being placed in a number of directions and laid on each other to reflect light in all directions, is used. The reflectivity of this reflector 16 is as high as 98% or more, and absorbs substantially no light, therefore a high recycling effect can be realized when reflection is repeated between the reflection type polarizer 10 and the reflector 16, thus making it possible to obtain a brighter display.

Next, a planar disposition relationship of the components of this liquid crystal display device will be explained with reference to FIG. 7. The meaning of plus/minus of the angle in the following explanation is the same as explained in the second embodiment with reference to FIG. 5.

As shown in FIG. 7, the absorption axis 11a of the upper polarizer 11 is placed at +15° with the horizontal axis H—H in the display screen as a reference. A lower molecular alignment direction 15a of the twisted retardation film 15 is placed at +60° with the horizontal axis H—H as a reference so as to orthogonally intersect an upper molecular alignment direction 6b of the liquid crystal cell 20. The absorption axis 12a of the lower polarizer 12 is placed at +75° with the horizontal axis H as a reference (−15° from the vertical axis). The transmission axis 10a of the reflection type polarizer 10 is placed at −15° with the horizontal axis H as a reference so as to correspond to the transmission axis of the lower polarizer 12, that is, to orthogonally intersect the absorption axis 12a of the lower polarizer 12. In the liquid crystal display device constituted as above, a normally black mode which enables a white display in a favorable black background with a high contrast is performed.

The effects of the liquid crystal display device will be explained using FIG. 8.

First, the transmission mode in which the light source 14 is turned on will be explained. The incident light I1 incident on the light guide film 8 from the light source 14 is propagated inside the light guide film 8, but it is scattered by the fine particles with the scattering property inside it, and a part of it is emitted directly upward, while another part is emitted downward, then reflected by the reflector 16, and emitted upward. The linearly polarized light component polarized in the direction of the transmission axis of the reflection type polarizer 10 out of the emitted light is transmitted through the reflection type polarizer 10, further transmitted through the lower polarizer 12 and the scattering layer 19 to be the linearly polarized light S1 and enters the liquid crystal cell 20.

The light reflected by the reflection type polarizer 10 has the polarization direction thereof rotated a little by the fine particles with the scattering property mixed in the light guide film 8 when it is transmitted through the light guide film 8 again, and when it is reflected by the reflector 16 and reaches the reflection type polarizer 10 again, a part of the light has the same polarization direction as the linearly polarized light S1. It is transmitted through the reflection type polarizer 10 to be a linearly polarized light P1a, and enters the liquid crystal cell 20. The residual light is reflected by the reflection type polarizer 10 again, it has its polarization direction rotated a little when it is transmitted through the light guide film 8, reflected by the reflector 16 and reaches the reflection type polarizer 10.

As described above, by repeating reflection between the reflector 16 and the reflection type polarizer 10 several times, most of light firstly reflected by the reflection type polarizer 10 becomes a linearly polarized light in the same polarization direction as the linearly polarized light P1, then it is transmitted through the reflection type polarizer 10, becomes linearly polarized light P1a, P1b, . . . , and is incident on the liquid crystal cell 20, therefore light of the light source 14 can be effectively utilized. Since the special reflector made by polarizing element with high reflectivity is used as the reflector 16 in this embodiment, the recycling effect is enhanced, and a brighter display than the liquid crystal display device in the second embodiment can be effected. Further, since a normally black mode is used in this embodiment, the contrast ratio in the transmission mode is as high as 30 or more, and thus a clear and favorable transmission display is obtained.

Next, the reflection mode in which the light source 14 is turned off and external light is utilized will be explained.

The external light is incident from upper side in FIG. 6, transmitted through the upper polarizer 11 to be a linearly polarized light, passes through the liquid crystal cell 20, and reaches the scattering layer 19 and the lower polarizer 12 as the incident light I2 shown in FIG. 8.

Since depolarizing degree of the scattering layer 10 is low, most of the incident light I2 is transmitted through the lower polarizer 12 and the reflection type polarizer 10 and reaches the light guide film 8. Here, since the light guide film 8 has low depolarizing degree, the light transmitted through the light guide film 8 is reflected by the reflector 16 while substantially maintaining its polarizing state, then it is transmitted through the light guide film 8 again, further transmitted through the reflection type polarizer 10, the lower polarizer 12 and the scattering layer 19 and enters the liquid crystal cell 20 as the linearly polarized light S2. As a result, a bright display can be obtained.

Here, since the scattering layer 19 uses a material having a polarization maintaining property, most of the incident light I2 is transmitted through the lower polarizer 12, and a bright reflection display can be obtained. Further, contrast is slightly reduced due to occurrence of back scattering D2 of a part of incident light I2 in the scattering layer 19, but it is at a level which presents no visual problem.

Further, since the light guide film with light scattering property in which the fine particles with the scattering property are mixed is also used as the light guide film 8 in this embodiment, moire caused by interference with the display pixels does not occur as in the conventional liquid crystal display device using the light guide film with the projections and depressions face being formed on the surface, and a favorable display without a sense of depth is obtained. Further, the light guide film has small retardance and small unevenness in the retardance, and thus a uniform reflection display is obtained.

As described above, by disposing the liquid crystal cell 20, the twisted retardation film 15 as an optical compensator provided at the visible side of the liquid crystal cell 20, the upper polarizer 11, the scattering layer 19 provided at the side opposite to the visible side of the liquid crystal cell 20, the lower polarizer 12, the reflection type polarizer 10, the light guide film 8 of side light type including the light source 14 at the side face, and the reflector 16 by the reflection type polarizer 10, the transflective liquid crystal display device capable of both a very bright transmission display and a bright reflection display without unevenness can be provided.

Further, in this embodiment, one twisted retardation film 15 is used as the optical compensator, but the similar liquid crystal display device can be provided with use of the retardation film as in the second embodiment. The twist angle of the twisted retardation film 15 and the disposition relationship are not limited to the example shown in FIG. 7, and a brighter display is obtained with use of the twisted retardation film with the twist angle of 180°.

Further, in this embodiment, the same light guide film 8 as in the first embodiment is used, but the one with the haze value of 10 to 80% can be used, and if the haze value is preferably 20 to 50%, a favorable property can be obtained. Furthermore, as in the second embodiment, a bright reflection display can be obtained even if the reflection type polarizer 10 is removed.

Figure 9:
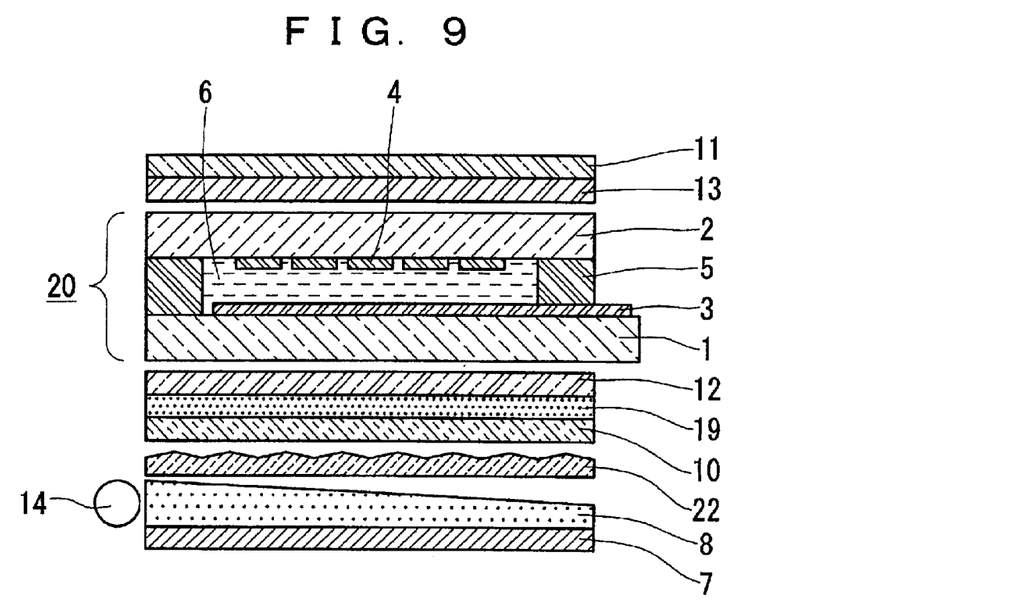
FIG. 9 is a schematic sectional view showing a constitution of a fourth embodiment of the liquid crystal display device according to the invention.

Forth Embodiment: FIG. 9

Next, a fourth embodiment of the liquid crystal display device according to the invention will be explained based on FIG. 9. FIG. 9 is a schematic sectional view showing a constitution of the liquid crystal display device, the same components as in FIG. 1, FIG. 3, and FIG. 6 are given the same reference numerals and symbols, and the explanation thereof will be omitted.

The fourth embodiment differs from the second embodiment explained based on FIG. 3 to FIG. 5 only in the point that a prism sheet 22 is placed between a reflection type polarizer 10 and a light guide film 8. Accordingly, only this point will be explained.

The prism sheet 22 is placed with a space being provided so as not to be in close contact with the reflection type polarizer 10. This prism sheet 22 is provided to increase the luminance at the time of transmission, and is an optical film of thickness of about 50 to 300 μm, manufactured by forming a prism shape on a surface of a methacrylic resin or a polycarbonate resin. To make the reflection display brighter, it is also preferable that this prism sheet 22 has the depolarization degree as low as possible. In this embodiment, the product under the trade name of BEF3 manufactured by 3M Co., Ltd. is used.

In this embodiment, by adding this prism sheet 22, the luminance in the transmission mode in which the light source 14 is turned on is about 1.5 times as much as the case in which the prism sheet is not used.

Meanwhile, the brightness in the reflection mode in which the light source 14 is turned off and external light is used reduces somewhat due to the depolarization property of the prism sheet. However, since the reflection type polarizer 10 is placed on the upper side of the prism sheet 22 in this embodiment, a part of the incident light depolarized by the prism sheet 22 can be emitted to the visible side due to the recycling effect between the reflector 7 and the reflection type polarizer 10, about 80% of the brightness is provided as compared with the case in which the prism sheet is not provided.

Figure 10:
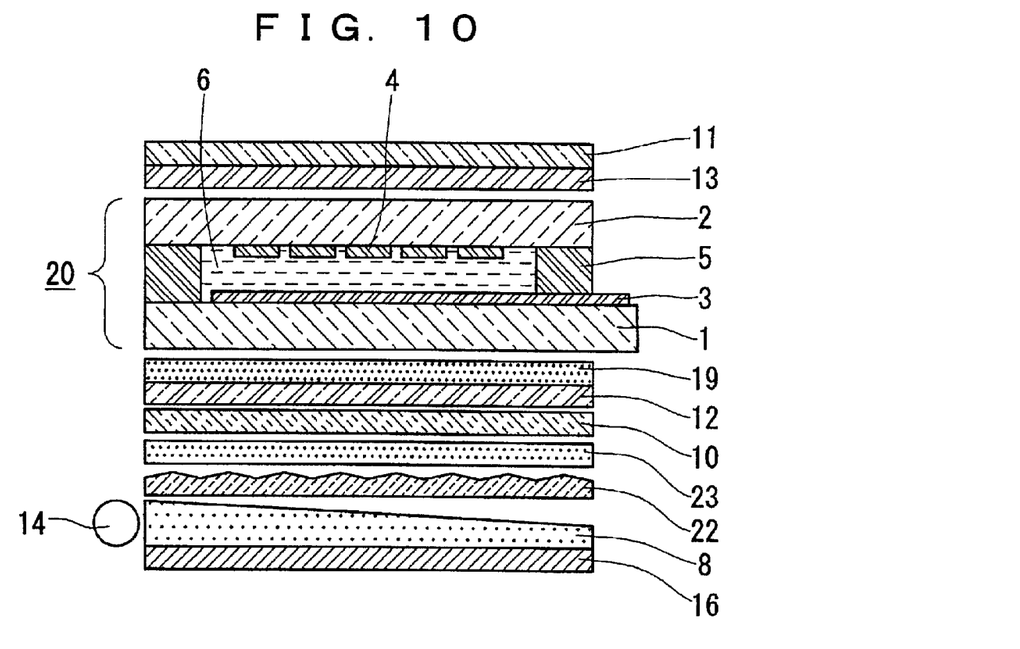
FIG. 10 is a schematic sectional view showing a constitution of a fifth embodiment of the liquid crystal display device according to the invention.

Fifth Embodiment: FIG. 10

Next, a fifth embodiment of the liquid crystal display device according to the invention will be explained based on FIG. 10. FIG. 10 is a schematic sectional view showing a constitution of the liquid crystal display device, and the same components as in FIG. 1, FIG. 3, FIG. 6 and FIG. 9 are given the same reference numerals and symbols, and the explanation thereof will be omitted.

The fifth embodiment differs from the third embodiment explained based on FIG. 6 to FIG. 8 in only the point that a prism sheet 22 and a scattering sheet 23 are placed between a reflection type polarizer 10 and a light guide film 8. Thus, only this point will be explained.

This liquid crystal display device is constituted of a liquid crystal cell 20, a twisted retardation film 15 being an optical compensator provided at a visible side of the liquid crystal cell 20, an upper polarizer 11, a scattering layer 19 provided at a side opposite to the visible side of the liquid crystal cell 20, a lower polarizer 12 and a reflection type polarizer 10, a scattering sheet 23, a prism sheet 22, a light guide film 8 of side light type including a light source 14 at a side face, and a reflector 16.

The reflection type polarizer 10, the scattering sheet 23 and the prism sheet 22 are placed on the light guide film 8 with a space provided between them so as not to be in close contact with each other. The scattering sheet 23 may be placed at any place if only it is between the reflection type polarizer 10 and the light guide film 8, and it may be placed at a lower side of the prism sheet.

The liquid crystal cell 20, the upper polarizer 11, the twisted retardation film 15, the lower polarizer 12, the scattering layer 19, the reflection type polarizer 10, the light guide film 8, the light source 14, and the reflector 16 are the same as those used in the third embodiment, and the prism sheet 22 is the same as that used in the fourth embodiment.

The scattering sheet 23 is provided to increase luminance at the time of transmission when the scattering degree of the scattering layer 19 is insufficient. It is important that this scattering sheet 23 has a polarization maintaining property. Namely, a material, which does not have so much retardance, has high transmittance and represents small back scattering, is preferable. In this embodiment, the scattering sheet 23 of thickness of 200 μm, which is made by dispersing a silicon resin into a transparent methacrylic resin, is used.

In this fifth embodiment, by adding the prism sheet 22 and the scattering sheet 23, the luminance in the transmission mode in which the light source 14 is turned on becomes about 1.7 times as bright as the case in which the prism sheet and the scattering sheet are not provided.

Meanwhile, the brightness in the reflection mode in which the light source 14 is turned off and external light is used reduces to some extent due to the depolarization property that the prism sheet 22 has and the depolarization property that the scattering sheet 23 has.

However, in this embodiment, the reflection type polarizer 10 is placed on an upper side of the scattering sheet 23, and further, the special reflector made by polarizing element with little light absorption is used as the reflector 16, therefore a part of the incident light depolarized by the prism sheet 22 and the scattering sheet 23 can be emitted to the visible side due to the recycling effect between the reflector 16 and the reflection type polarizer 10. As a result, about 70% of the brightness can be obtained as compared with the case in which the prism sheet 22 and the scattering sheet 23 are not provided.

In this embodiment, the prism sheet 22 and the scattering sheet 23 are used, but it is possible to remove the scattering sheet 23 and place only the prism sheet 22. In this case, the luminance in the transmission mode becomes about 1.5 times as much as the case in which the prism sheet 22 is not provided, and 80% of the brightness can be obtained in the reflection mode.

Further, it is possible to add the scattering sheet 23 to the constitution of the fourth embodiment shown in FIG. 9 and include the prism sheet 22 and the scattering sheet 23 between the light guide film 8 and the reflection type polarizer 10.

Figure 11:
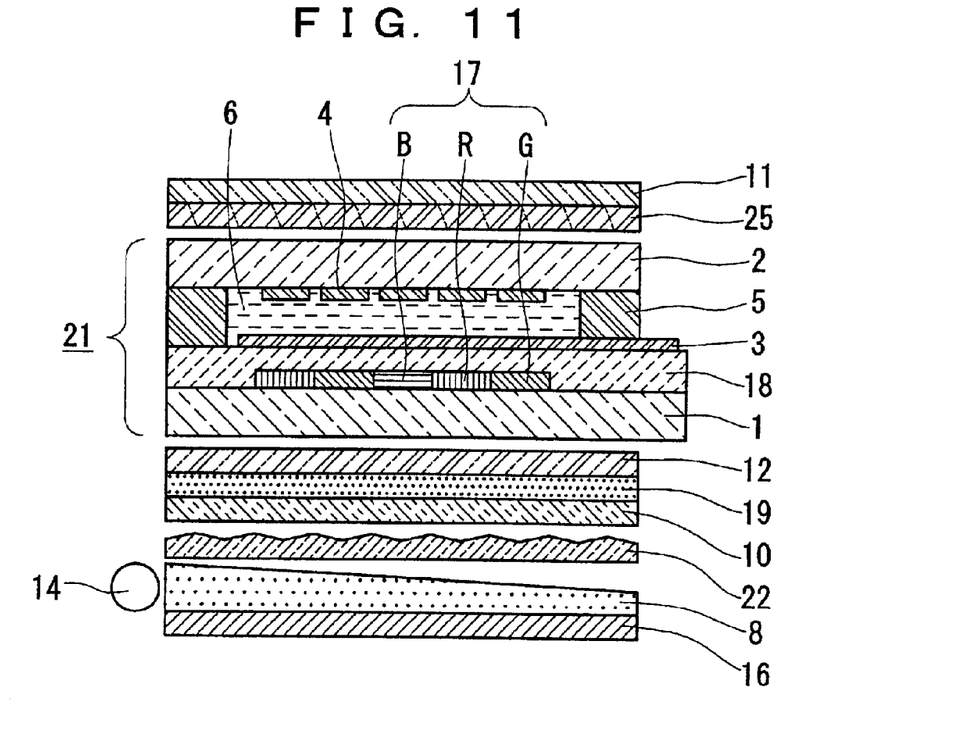
FIG. 11 is a schematic sectional view showing a constitution of a sixth embodiment of the liquid crystal display device according to the invention.
Figure 12:
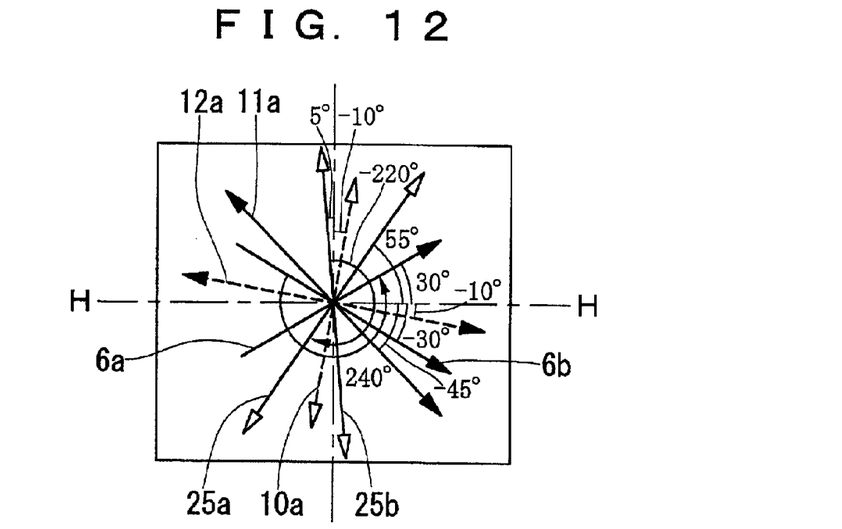
FIG. 12 is a diagram to explain planar disposition relationship of components thereof.

Sixth Embodiment: FIG. 11 and FIG. 12

Next, a sixth embodiment of the liquid crystal display device according to the invention will be explained with reference to FIG. 11 and FIG. 12.

FIG. 11 is a schematic sectional view to explain a constitution of the liquid crystal display device, and FIG. 12 is a plan view showing deposition relationship of the components. In these drawings, the same components as in FIG. 1 to FIG. 10 are given the same reference numerals and symbols, and the explanation thereof will be omitted.

The liquid crystal display device of the sixth embodiment differs from the fourth embodiment explained based on FIG. 9 in the points that a twisted retardation film 25 for a normally white mode is used as an optical compensator and a color filter 17 is provided in a liquid crystal cell 21.

The liquid crystal display device according to the six embodiment is constituted of a liquid crystal cell 21, a twisted retardation film 25 being an optical compensator and an upper polarizer 11 provided at a visible side of the liquid crystal cell 21, a lower polarizer 12 provided at a side opposite to the visible side of the liquid crystal cell 21, a scattering layer 19, a reflection type polarizer 10, a light guide film 8 of side light type including a light source 14 at a side face, and a reflector 16.

The upper polarizer 11, the lower polarizer 12, the scattering layer 19, the reflection type polarizer 10 and the light guide film 8 are the same as those used in the second embodiment explained based on FIG. 3, and therefore the explanation thereof will be omitted. As for the reflector 16, the product under the trade name of ESR manufactured by 3M Co., Ltd., which is the same as that used in the third embodiment explained based on FIG. 6 to FIG. 8, is used. As the prism sheet 22, the product under the trade name of BEF3 manufactured by 3M Co., Ltd., which is the same as that used in the fourth embodiment explained based on FIG. 9, is used.

The structure of the twisted retardation film 25 is the same as the twisted retardation film 15 used in the third embodiment, and in this embodiment, the twisted retardation film 25 with a twist angle of 220° in a clockwise direction and the Δnd value Rc indicating a birefringence effect being Rc=0.63 μm is used.

As for the light source 14, a cold cathode fluorescent tube with a diameter of 2 mm is used to increase the backlight luminance, and the luminance of 1000 cd/m² is obtained as backlight.

In the liquid crystal cell 21, a color filter 17 in which filters of three colors: red (R), green (G), and blue (B) are alternately arranged so that the filters of different colors are adjacent to each other is formed on an inner face of a first substrate 1 composed of a glass plate of thickness of 0.5 mm, coating of a transparent protection film 18 is applied onto the color filter 17 to flatten steps, and a scanning electrode 3 composed of ITO which is a transparent electrode material is formed on the surface thereof in a stripe form. The other constitutions are the same as in the liquid crystal cell 20 in each of the aforementioned embodiments.

A birefringence difference Δn of the nematic liquid crystal 6 which is used is 0.131, and a cell gap d being a gap between the first substrate 1 and a second substrate 2 is set to be 6.2 μm. Accordingly, the Δnd value indicating birefringence amount of the liquid crystal cell 21 is 0.81 μm from the product of the difference Δn of the birefringence of the nematic liquid crystal 6 and the cell gap d.

The color filter 17 can be formed by printing, transfer, electro-deposition and the like. In this fifth embodiment, with use of color resist made by dispersing pigment into a transparent photosensitive resin, a pigment dispersion type color filter of a thickness of 1.0 μm for a reflection type color LCD with high spectral transmittance is used.

As for the protection film 18, an acrylic resin of thickness of 3 μm is used, and the flatness of the surface is controlled to be ±0.05 μm or less.

Next, planar disposition relationship of the components of this liquid crystal display device will be explained based on FIG. 12. The meaning of plus/minus of the angles explained in the following explanation is the same as in the explanation based on FIG. 5 in the second embodiment.

As shown in FIG. 12, an absorption axis 11a of the upper polarizer 11 is placed at −45° with the horizontal axis H—H in the display screen as a reference. As for the twisted retardation film 25, a lower molecular alignment direction 25a is placed at +55° with the horizontal axis H—H as the reference, and an upper molecular alignment direction 25b is placed at −85° with the horizontal axis H—H as the reference (+5° from the vertical axis). An absorption axis 12a of the lower polarizer 12 is placed at −10° with the horizontal axis H—H as the reference. The transmission axis 10a of the reflection type polarizer 10 is placed at 80° with the horizontal axis H—H as the reference (−10° from the vertical axis) so as to correspond to the transmission axis of the lower polarizer 12 and to orthogonally intersect an absorption axis 12a thereof. In the liquid crystal display device as constituted above, a normally white mode, which enables a black display in a favorable white background with high contrast, is provided.

The effects of this liquid crystal display device is substantially the same as in the case of the second embodiment explained with use of FIG. 4. However, by placing the prism sheet 22 between the light guide film 8 and the reflection type polarizer 10, the luminance of the transmission display is improved to be about 1.5 times. On the other hand, however, the prism sheet 22 has a depolarizing property to some extent, which makes the reflection display a little darker, but the reflection type polarizer with reflectivity of 98% or more is used as the reflector 16, and therefore sufficient brightness is obtained even in the reflection display owing to the recycling effect with the reflection type polarizer 10.

In this embodiment, as a result of providing the color filter 17, the transmittance is reduced to about one half, but since the normally white mode is used, the reflectivity of white is high, and therefore a color display with favorable brightness is obtained in the reflection mode. Further, in the transmission mode, a bright color display can be also obtained.

Furthermore, since the light guide film with the scattering property in which the fine particles with the scattering property are mixed is also used as the light guide film 8 in this embodiment, moire caused by the interference with the display pixels does not occur as in the conventional liquid crystal display device using the light guide film with the projections and depressions face being formed on the surface, and thus a favorable display without a sense of depth can be obtained. Further, the light guide film has small retardance and small unevenness of retardance, thereby uniform reflection color display can be obtained.

In this embodiment, the color filter 17 is provided at the side of the first substrate 1, but it is possible to place it at the side of the second substrate 2. Further, it is possible to omit the protection film 18 and provide the first electrode 3 directly on the color filter if flatness and heat resistance of the color filter 17 is favorable.

Further, it is possible to place it between the prism sheet 22 and the reflection type polarizer 10, and further insert the scattering sheet to adjust the luminance at the time of transmission. It is preferable that the scattering sheet used in this case is made of a material with the depolarization degree as low as possible.

Even if the reflection type polarizer 10 is removed from the constitution of this embodiment to make a simple structure, a display which is bright enough for practical use can be obtained though the transmission display and the reflection display become a little darker.

As obvious from the above explanation, in the liquid crystal display device according to the invention, luminance of the transmission display in the transmission mode is high, a bright reflection display can be obtained in the reflection mode, moire does not occur in spite of a simple structure, and a favorable display with little sense of depth and little display unevenness can be realized.

What is claimed is:

1. A liquid crystal display device, comprising:
   a liquid crystal cell holding nematic liquid crystal with twisted alignment between a first substrate having a first electrode and a second substrate having a second electrode;
   an upper polarizer provided outside the second substrate at a visible side of said liquid crystal cell;
   a lower polarizer and a scattering layer provided outside the first substrate at a side opposite to the visible side of said liquid crystal cell;
   a light guide film of side light type provided outside said lower polarizer and said light scattering layer; and
   a reflector provided outside said light guide film,
   wherein said light guide film is a light guide film with a light scattering property in which particles with a light scattering property are mixed;
   each of said scattering layer and said light guide film with the light scattering property has a property of scattering incident light while substantially maintaining a polarizing state thereof, and
   wherein a reflection display on a visible side is performed by reflecting light incident from the visible side at a reflection layer provided outside said light guide film, and a transmission display on the visible side is performed with incident light from said light guide film.

2. The liquid crystal display device according to claim 1, further comprising a reflection type polarizer having a reflection axis and a transmission axis is provided between said light guide film and said lower polarizer or said scattering layer.

3. The liquid crystal display device according to claim 1, further comprising a prism sheet provided between said light guide film and said lower polarizer or said scattering layer.

4. The liquid crystal display device according to claim 2, further comprising a prism sheet provided between said light guide film and said reflection type polarizer.

5. The liquid crystal display device according to claim 1, further comprising a scattering sheet provided between said light guide film and said lower polarizer or said scattering layer.

6. The liquid crystal display device according to claim 2, further comprising a scattering sheet is provided between said light guide film and said reflection type polarizer.

7. The liquid crystal display device according to claim 1, further comprising one or a plurality of optical compensators are provided between the second substrate and said upper polarizer.

8. The liquid crystal display device according to claim 2, further comprising one or a plurality of optical compensators are provided between the second substrate and said upper polarizer.

9. The liquid crystal display device according to claim 1, wherein said reflector is a special reflector made by polarizing element which reflects light in all directions.

10. The liquid crystal display device according to claim 2, wherein said reflector is a special reflector made by polarizing element which reflects light in all directions.

11. The liquid crystal display device according to claim 1, wherein said light guide film is constituted of a semitransparent material with a haze value indicating a scattering degree being 20 to 50%.

12. The liquid crystal display device according to claim 2, wherein said light guide film is constituted of a semitransparent material with a haze value indicating a scattering degree being 20 to 50%.

13. The liquid crystal display device according to claim 1, wherein said light guide film is constituted of a methacrylic resin in which fine particles of a silicon resin are mixed.

14. The liquid crystal display device according to claim 2, wherein said light guide film is constituted of a methacrylic resin in which fine particles of a silicon resin are mixed.

15. The liquid crystal display device according to claim 1, further comprising a color filter of a plurality of colors provided on either one of the first substrate or the second substrate.

16. The liquid crystal display device according to claim 2, further comprising a color filter of a plurality of colors provided on either one of the first substrate or the second substrate.

* * * * *